(12) United States Patent
Choi

(10) Patent No.: US 12,715,447 B2
(45) Date of Patent: Aug. 25, 2026

(54) VEHICLE CONTROL SYSTEM AND VEHICLE DRIVING METHOD USING THE VEHICLE CONTROL SYSTEM

(71) Applicant: HYUNDAI MOBIS CO., LTD., Seoul (KR)

(72) Inventor: Kwang Ii Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 412 days.

(21) Appl. No.: 17/950,307

(22) Filed: Sep. 22, 2022

(65) Prior Publication Data

US 2023/0150515 A1 May 18, 2023

(30) Foreign Application Priority Data

Nov. 16, 2021 (KR) ........................ 10-2021-0157991
Nov. 16, 2021 (KR) ........................ 10-2021-0158000

(51) Int. Cl.
*B60W 40/10* (2012.01)
*B60W 60/00* (2020.01)

(52) U.S. Cl.
CPC ........... *B60W 40/10* (2013.01); *B60W 60/001* (2020.02); *B60W 2420/403* (2013.01); *B60W 2520/14* (2013.01); *B60W 2520/28* (2013.01); *B60W 2540/00* (2013.01); *B60W 2554/4041* (2020.02); *B60W 2554/4045* (2020.02);
(Continued)

(58) Field of Classification Search
CPC ............... B60W 40/10; B60W 60/001; B60W 2420/403; B60W 2520/14; B60W 2520/28; B60W 2540/00; B60W 2554/4041; B60W 2554/4045; B60W 2554/4049; B60W 2556/40; B60W 2556/45; B60W 2552/53; B60W 2554/80; B60W 2556/05; B60W 2756/10; B60W 30/10; B60W 30/12;
(Continued)

(56) References Cited

U.S. PATENT DOCUMENTS 4,651,290 A * 3/1987 Syouichi ............ B60G 17/0165
2015/0294571 A1* 10/2015 Mitsuhisa .............. G01C 21/26
(Continued)

FOREIGN PATENT DOCUMENTS

CN 105122328 A * 4/2014 ............. G01D 5/353
WO WO2019222358 A1 * 11/2019 ......... G01C 21/3407

*Primary Examiner* — Rachid Bendidi
*Assistant Examiner* — Kirsten Jade M Santos
(74) *Attorney, Agent, or Firm* — NSIP Law

(57) ABSTRACT

Disclosed is a vehicle control system that includes a sensor that acquires data related to driving of a vehicle from the vehicle and an external environment, and a processor that processes the data related to the driving of the vehicle to determine trajectories, calculates a variance of a movement value of each trajectory measured by the sensor and determines a noise level of a road surface of the trajectory, calculates bidirectional trajectories information of a current point of a three-dimensional map, identifies whether a road width of the current point is greater than or equal to a first threshold value, identifies whether there is no overlapping section between the bidirectional trajectories in a vehicle width direction, updates the bidirectional trajectories information and the noise level, applies a weight based on the noise level to each trajectory, and applies a final valid trajectory to the three-dimensional map.

12 Claims, 14 Drawing Sheets

(52) U.S. Cl.
CPC . *B60W 2554/4049* (2020.02); *B60W 2556/40* (2020.02); *B60W 2556/45* (2020.02)

(58) Field of Classification Search
CPC ............. B60W 30/18163; G06V 20/58; G06V 20/588; G08G 1/04; G08G 1/167
See application file for complete search history.

(56) References Cited

U.S. PATENT DOCUMENTS

2018/0045832 A1* 2/2018 Faroog ..................... B60Q 9/00
2019/0283743 A1* 9/2019 Koji ...................... B60W 10/04
2020/0363806 A1* 11/2020 Marin ................. B60W 60/001

* cited by examiner

VEHICLE CONTROL SYSTEM AND VEHICLE DRIVING METHOD USING THE VEHICLE CONTROL SYSTEM

CROSS-REFERENCE TO RELATED APPLICATIONS

This application claims the benefit under 35 USC § 119(a) of Korean Patent Application Nos. 10-2021-0157991 and 10-2021-0158000, all filed on Nov. 16, 2021, in the Korean Intellectual Property Office, the entire disclosures of which are incorporated herein by reference for all purposes.

BACKGROUND

1. Field

The present disclosure relates to a vehicle control system and a vehicle driving method using the vehicle control system, and more particularly, to an autonomous driving technology that improves accuracy of a target travel route.

2. Description of Related Art

Autonomous driving technology may include setting a travel route of a vehicle and having the vehicle travel according to the set travel route while the driver does not drive the vehicle directly. Autonomous driving technology has been implemented in a scheme of acquiring route information on the travel route, setting the travel route based on the obtained route information, and driving the vehicle according to the set route.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a vehicle control system that includes sensors configured to acquire data related to driving of a vehicle from the vehicle and an external environment, processors that process the data related to the driving of the vehicle to determine trajectories, calculate a variance of a movement value of the trajectories measured by the sensors and determine noise levels of a road surface of the trajectories based on the variance, calculate bidirectional trajectories information of a current point of a three-dimensional map, identify whether a road width of the current point is greater than or equal to a first threshold value, identify whether there is no overlapping section between the bidirectional trajectories in a vehicle width direction in response to a determination that the road width of the current point is equal to or greater than the first threshold value, update the bidirectional trajectories information and the noise levels in response to a determination that there is no overlapping section between the bidirectional trajectories in the vehicle width direction, apply at weights based on the noise levels to the trajectories when calculating a final trajectory, and apply the final valid trajectory to the three-dimensional map.

The system may include an input device for receiving a user input for controlling a driving function of the vehicle, an imaging device for sensing and imaging the external environment, an output device providing information related to the driving of the vehicle, and a vehicle controller configured to control the driving of the vehicle.

The processors may calculate a difference value between a maximum value and a minimum value for a specified time duration for each of a plurality of wheel speed sensors included in the sensors.

The processors may calculate a difference value between a maximum value and a minimum value for a specified time duration for each of a plurality of wheel speed sensors included in the sensors.

The processors may calculate the variance of the movement value for the specified time duration based on the difference value of each of the plurality of wheel speed sensors.

The processors may determine an average noise level of the road surface based on the variance of the movement value.

The processors may apply different weights to different positions of each of the at least one trajectory based on the at least one noise level, thereby calculating the final valid trajectory.

In another general aspect, here is provided a vehicle control system that includes sensors for acquiring data related to the driving of the vehicle from a vehicle and an external environment, a vehicle controller configured to control the driving of the vehicle, and processors that acquire other vehicle information and lane information using the sensors, transmit the other vehicle information and the lane information to a server, receive information related to an adjacent vehicle from the server, identify whether the adjacent vehicle has changed a lane, and transmit information related to whether the adjacent vehicle has changed the lane to the server for the server to determine whether the lane change of the adjacent vehicle is valid.

The system may include an input device for receiving a user input for controlling a driving function of the vehicle, an imaging device for sensing and imaging the external environment, and an output device for providing information related to the driving of the vehicle.

The processors may transmit GPS information, information the vehicles, and the lane information recognized using the sensors to the server.

When a line on an actual road is recognized, the processors may determine similarity of a field of view (FOV) range of a line toward a position of the adjacent vehicle and a longitudinal distance of an object with each other, and identify whether a signal of the FOV range of the line is discontinuous and thus identify whether the adjacent vehicle has changed the lane.

When the line on the road is not recognized, the processors may generate a virtual line based on a yaw rate based on the vehicle having the system, and identify whether the adjacent vehicle crosses the virtual line and thus identify whether the adjacent vehicle has changed the lane.

The server may exclude unnecessary line change trajectory as a line change other than the valid line change in calculating a trajectory.

In another general aspect, here is provided a method for driving a vehicle using a vehicle control system that includes calculating a variance of a movement value of each trajectory measured by sensors of the vehicle control system, and determining a noise level of a road surface of the trajectory based on the variance, calculating bidirectional trajectories information of a current point of a three-dimensional map, identifying whether a road width of the current point is greater than or equal to a first threshold value, identifying whether there is no overlapping section between the bidirectional trajectories in a vehicle width direction in response to a determination that the road width of the current point is equal to or greater than the first threshold value, updating the bidirectional trajectories information and the noise level of the current point in response to a determination that there is no overlapping section between the bidirectional trajectories in the vehicle width direction, applying a weight based on the noise level to each trajectory when determining a final valid trajectory, and applying the final valid trajectory to the three-dimensional map.

The determining of the noise level of the road surface may include calculating a difference value between a maximum value and a minimum value for a specified time duration for each of a plurality of wheel speed sensors included in the sensors.

The determining of the noise level of the road surface may include calculating the variance of the movement value for the specified time duration based on the difference value of each of the plurality of wheel speed sensors.

The determining of the noise level of the road surface may include determining an average noise level of the road surface based on the variance of the movement value.

The applying of the weight may include applying different weights to different positions of each trajectory based on the noise level, thereby calculating the final valid trajectory.

Other features and aspects will be apparent from the following detailed description, the drawings, and the claims.

Figure 1:
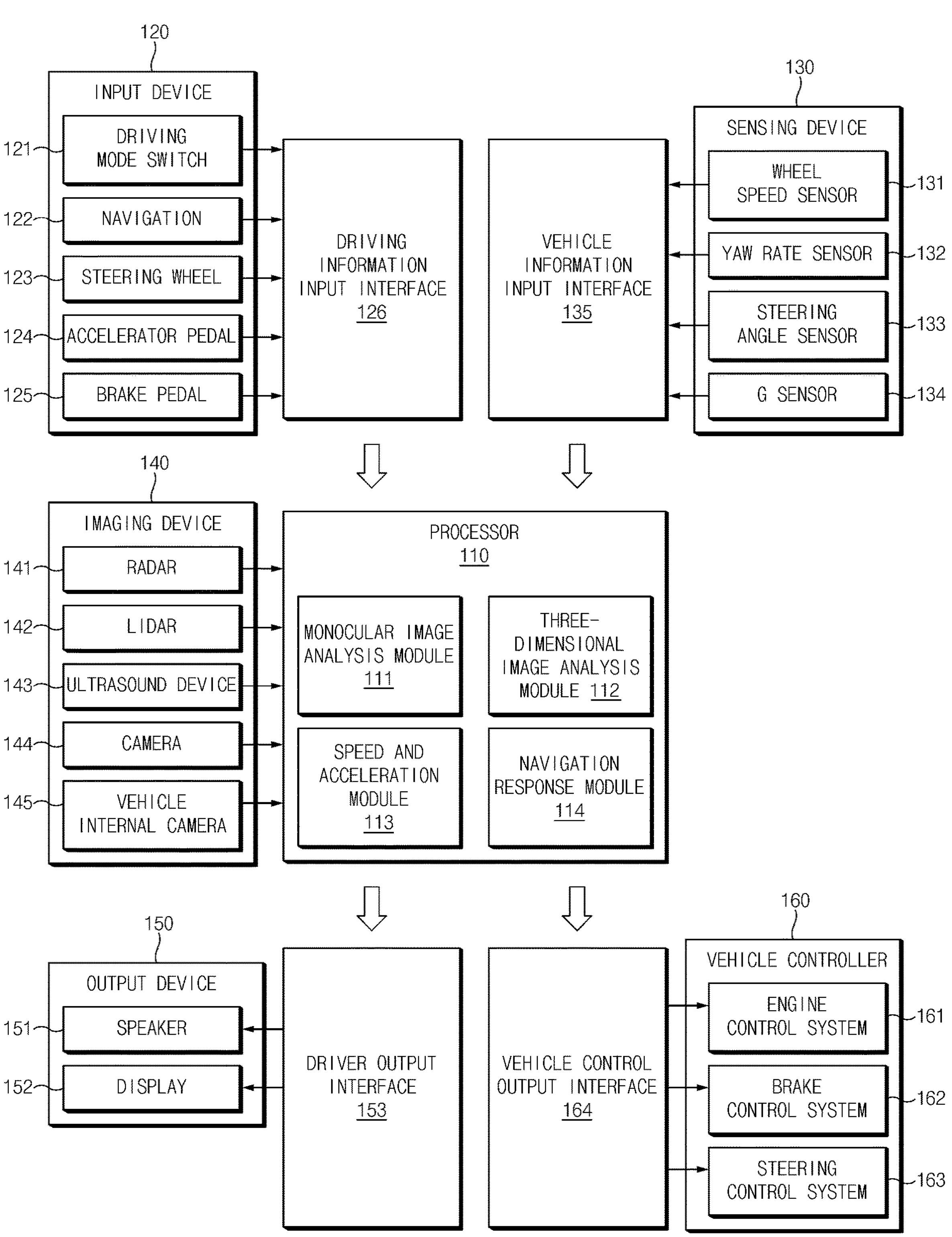
FIG. 1 is a block diagram showing a vehicle control system according to one embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being “connected to,” or “coupled to” another component, it may be directly “connected to,” or “coupled to” the other component, or there may be one or more other components intervening therebetween. In contrast, when an element is described as being “directly connected to,” or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIG. 1 is a block diagram showing a vehicle control system according to one embodiment of the present disclosure.

The vehicle control system according to one embodiment may include a processor 110, an input device 120, a sensing device 130, an imaging device 140, an output device 150, and a vehicle controller 160.

The processor 110 may realize autonomous driving by processing data related to driving of a vehicle. The processor 110 may include a monocular image analysis module 111, a three-dimensional image analysis module 112, a speed and acceleration module 113, and a navigation response module 114.

The monocular image analysis module 111 may analyze a monocular image of an image set acquired by the imaging device 140. The monocular image analysis module 111 may merge data included in the image set with other types of data acquired by the imaging device 140 to perform monocular image analysis. The monocular image analysis module 111 may detect, within the image set, features such as a lane marking, a vehicle, a pedestrian, a road sign, a highway interchange, a traffic light, a risk object, and other feature related to the vehicle's surroundings. The processor 110 of the vehicle control system may cause at least one navigation response such as rotation, lane change, or acceleration change of the vehicle, based on the analysis result of the monocular image analysis module 111.

The three-dimensional image analysis module 112 may combine data acquired from the imaging device 140 and data acquired from the sensing device 130 with each other and perform analysis thereon. The three-dimensional image analysis module 112 may perform three-dimensional image analysis. The three-dimensional image analysis module 112 may implement a method related to a neural network learning system, a deep neural network learning system, or a non-learning system that utilizes a computer vision algorithm to detect and/or label an object in a context of capturing and processing sensed information. The three-dimensional image analysis module 112 may employ a combination of a learning system and a non-learning system.

The speed and acceleration module 113 may control change in a speed and/or an acceleration of the vehicle. The speed and acceleration module 113 may calculate a target speed of the vehicle based on data obtained from the monocular image analysis module 111 and/or the three-dimensional image analysis module 112. The data obtained from the monocular image analysis module 111 and/or the three-dimensional image analysis module 112 may include a target position, a speed, an acceleration, the vehicle's position and/or speed with respect to a surrounding vehicle, a pedestrian or an object on a road, and position information of the vehicle for lane indication of the road. The speed and acceleration module 113 may transmit a speed control signal to the vehicle controller 160 based on the calculated target speed.

The navigation response module 114 may determine a necessary (or alternatively, desired, prudent, etc.) navigation response based on the data obtained from the monocular image analysis module 111, the three-dimensional image analysis module 112, and the input device 120. The data obtained from the monocular image analysis module 111, the three-dimensional image analysis module 112, and the input device 120 may include a position and a speed of the vehicle with respect to a surrounding vehicle, a pedestrian, and an object on a road, and target position information of the vehicle. The navigation response may be determined based on map data, preset vehicle position, a relative speed or a relative acceleration between the vehicle and at least one object. The navigation response module 114 may transmit a navigation control signal to the vehicle controller 160 based on a navigation response determined as being necessary. For example, the navigation response module 114 may generate the necessary navigation response by rotating the vehicle's steering handle to induce rotation by a preset angle. The navigation response determined to be necessary by the navigation response module 114 may be used as data input to the speed and acceleration module 113 to calculate a speed change of the vehicle.

The input device 120 may receive a user input for controlling a driving function. The input device 120 may include a driving mode switch 121, a navigation 122, a steering wheel 123, an accelerator pedal 124, and a brake pedal 125. The input device 120 may transmit the user input to the processor 110 through a driving information input interface 126.

The sensing device 130 may acquire data related to driving of the vehicle from the vehicle and an external environment. The sensing device 130 may include a wheel speed sensor 131, a yaw rate sensor 132, a steering angle sensor 144, and a G sensor 134. The sensing device 130 may transmit the acquired data to the processor 110 through a vehicle information input interface 135.

The imaging device 140 may detect and image an external environment. The imaging device 140 may include a radar 141, a lidar 142, an ultrasound device 143, a camera 144, and a vehicle internal camera 145. The imaging device 140 may transmit the sensed and imaged external environment to the processor 110.

The output device 150 may provide information related to driving of the vehicle to an occupant including the driver. The output device 150 may include a speaker 151 and a display 152. The output device 150 may provide information related to driving of the vehicle output from the processor 110 through a driver output interface 153 to the occupant.

The vehicle controller 160 may control driving of the vehicle. The vehicle controller 160 may include an engine control system 161, a brake control system 162, and a steering control system 163. The vehicle controller 160 may receive driving control information output from the processor 110 through a vehicle control output interface 164 to control driving of the vehicle.

Figure 2:
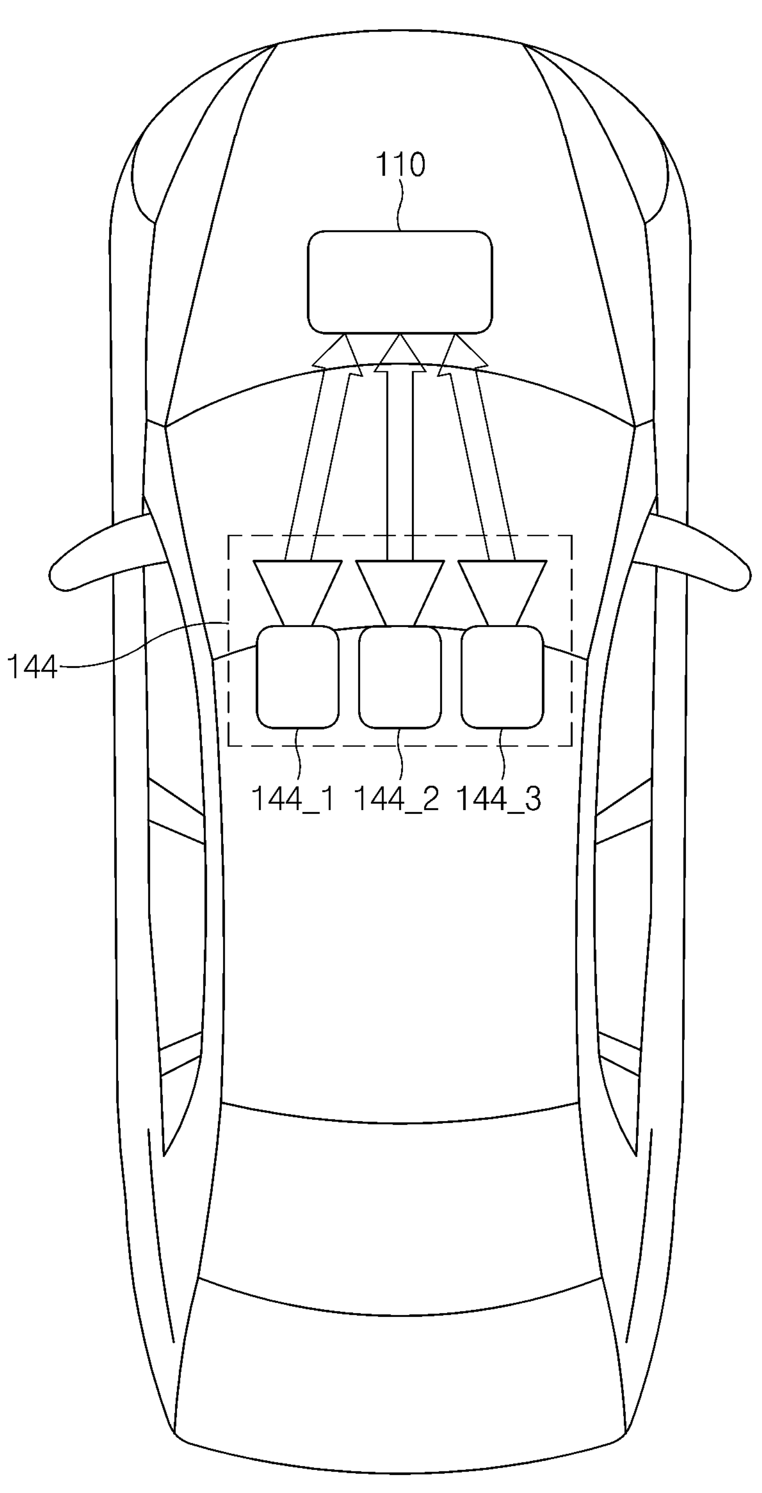
FIG. 2 is a view showing a position at which a camera of a vehicle control system according to one embodiment of the present disclosure is disposed on a vehicle.

FIG. 2 is a view showing the position in which a camera of the vehicle control system according to one embodiment of the present disclosure is disposed on the vehicle.

A camera 144 may include a first camera device 144_1, a second camera device 144_2, and a third camera device 144_3. The first camera device 144_1, the second camera device 144_2, and the third camera device 144_3 may be arranged side by side in a width direction of the vehicle. The first camera device 144_1, the second camera device 144_2, and the third camera device 144_3 may be disposed around a rear view mirror of the vehicle and/or adjacent to a driver seat. At least portions of field of views (FOV) of the first camera device 144_1, the second camera device 144_2, and the third camera device 144_3 may overlap each other.

The camera 144 may image an external environment. The camera 144 may fuse image information imaged by the first camera device 144_1, the second camera device 144_2, and the third camera device 144_3 with each other. The camera 144 may acquire a three-dimensional image using differences between field of views (FOV) thereof based on differences between positions of the first camera device 144_1, the second camera device 144_2, and the third camera device 144_3. The camera 144 may transmit image data of the external environment as captured to the processor 110.

Figure 3:
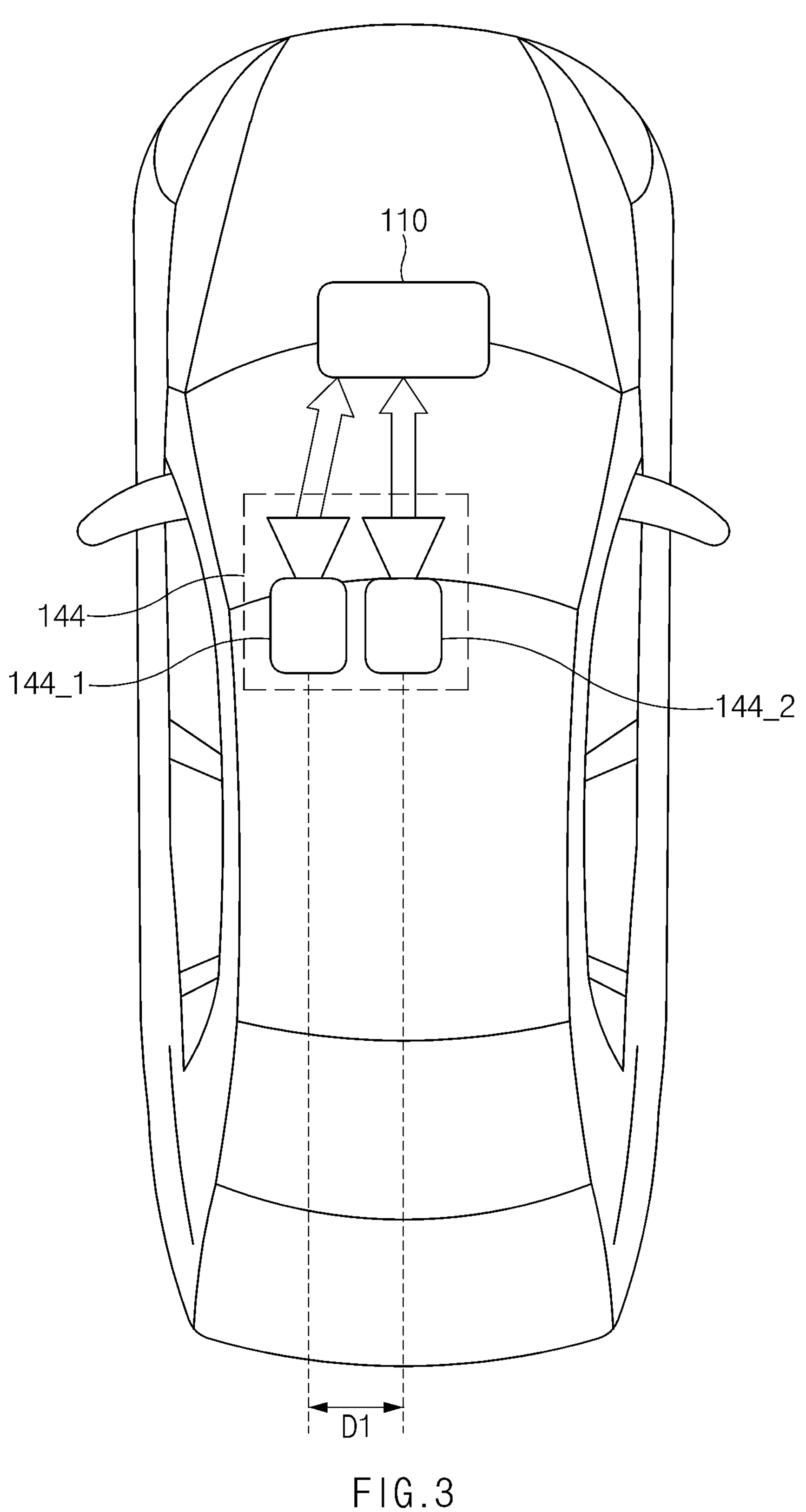
FIG. 3 is a view showing a position at which a camera of a vehicle control system according to one embodiment of the present disclosure is disposed on a vehicle.

FIG. 3 is a view showing a position in which a camera of the vehicle control system according to one embodiment of the present disclosure is disposed on the vehicle.

The camera 144 may include the first camera device 144_1 and the second camera device 144_2. The first camera device 144_1 and the second camera device 144_2 may be arranged side by side in the width direction of the vehicle. The first camera device 144_1 and the second camera device 144_2 may be arranged around the rear view mirror of the vehicle and/or adjacent to the driver seat. At least portions of field of views (FOV) of the first camera device 144_1 and the second camera device 144_2 may overlap each other. The first camera device 144_1 and the second camera device 144_2 may be spaced apart from each other by a first distance D1 in the width direction of the vehicle.

The camera 144 may image an external environment. The camera 144 may fuse image information imaged by the first camera device 144_1 and the second camera device 144_2 with each other. The camera 144 may acquire a three-dimensional image using a difference between the field of views (FOV) thereof based on a difference between positions of the first camera device 144_1 and the second camera device 144_2. The camera 144 may transmit the image data of the external environment as captured to the processor 110.

Figure 4:
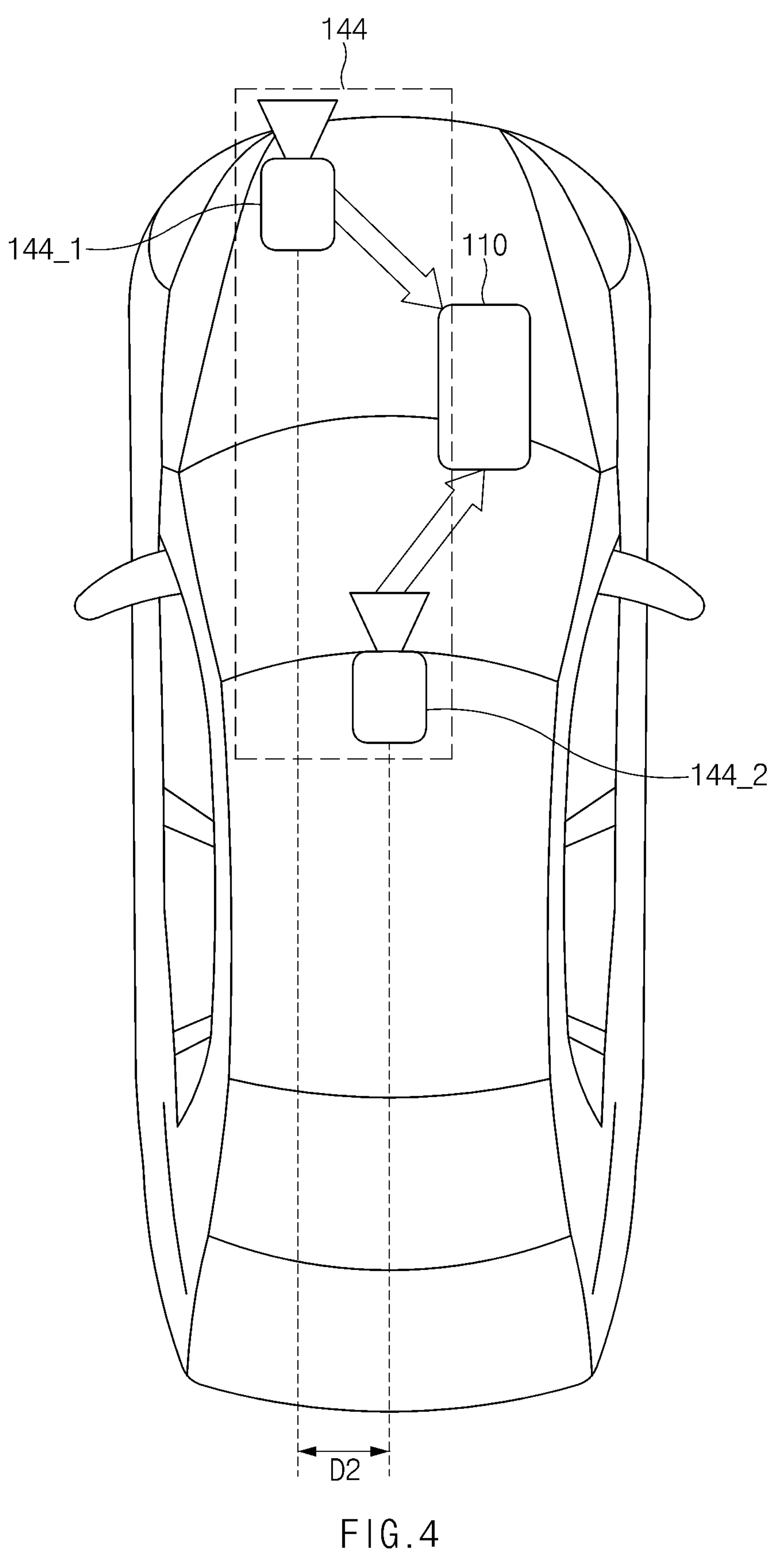
FIG. 4 is a view showing a position at which a camera of a vehicle control system according to one embodiment of the present disclosure is disposed on a vehicle.

FIG. 4 is a view showing a position in which a camera of the vehicle control system according to one embodiment of the present disclosure is disposed on the vehicle.

The camera 144 may include the first camera device 144_1, the second camera device 144_2, and the third camera device 144_3. The first camera device 144_1 may be disposed above a bumper area of the vehicle or inside the bumper area. The first camera device 144_1 may be disposed adjacent to any one of corners of the bumper area. The second camera device 144_2 may be disposed around the rear view mirror of the vehicle and/or adjacent to the driver seat. At least portions of field of views (FOV) of the first camera device 144_1 and the second camera device 144_2 may overlap each other. The first camera device 144_1 and the second camera device 144_2 may be spaced apart from each other by a second distance D2 in the width direction of the vehicle.

The camera 144 may image an external environment. The camera 144 may fuse image information imaged by the first camera device 144_1 and the second camera device 144_2 with each other. The camera 144 may acquire a three-dimensional image using a difference between the field of views (FOV) thereof based on a difference between positions of the first camera device 144_1 and the second camera device 144_2. The camera 144 may transmit the image data of the external environment as captured to the processor 110.

Figure 5:
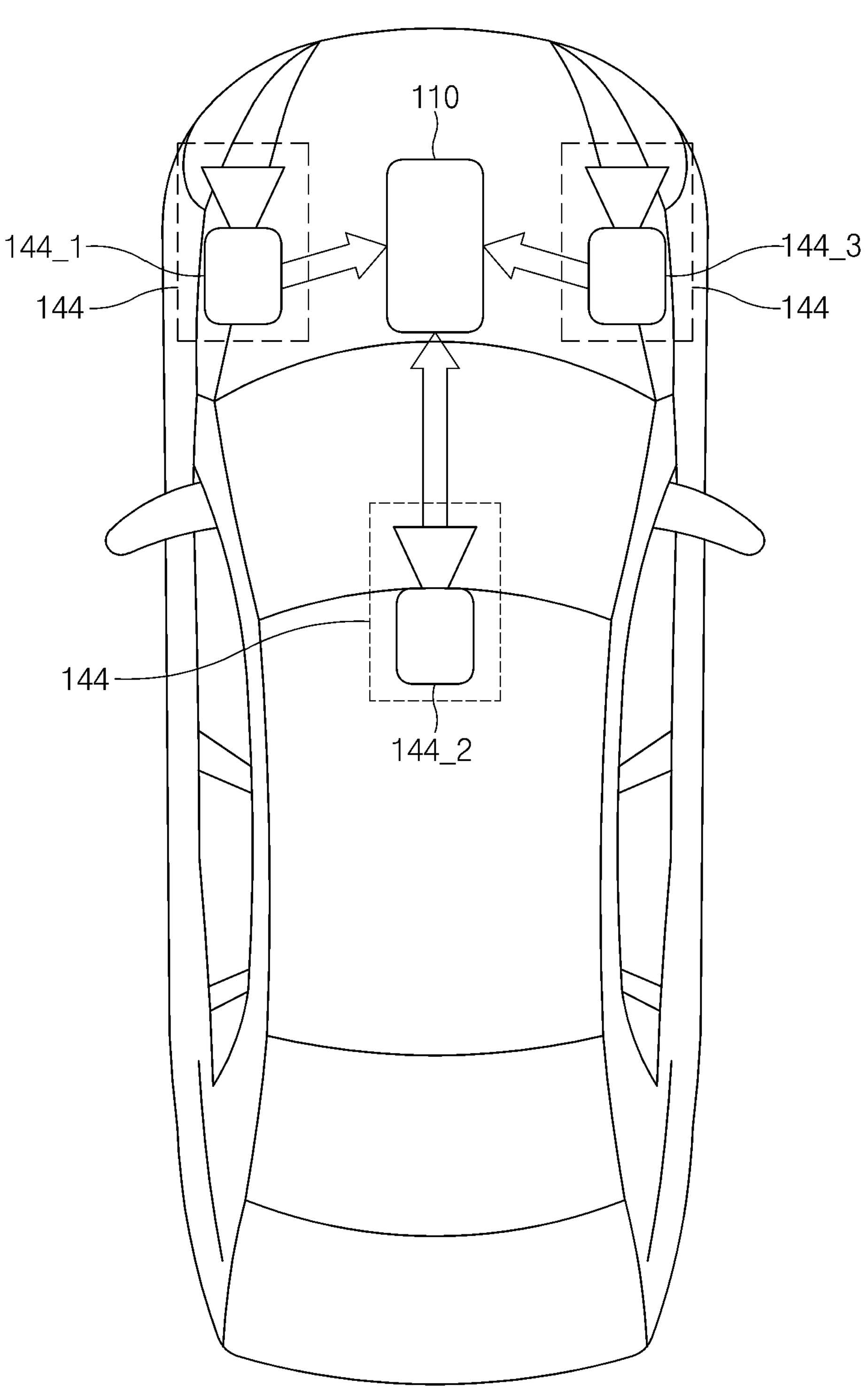
FIG. 5 is a view showing a position in which a camera of a vehicle control system according to one embodiment of the present disclosure is disposed on a vehicle.

FIG. 5 is a view showing a position in which a camera of the vehicle control system according to one embodiment of the present disclosure is disposed on the vehicle.

The camera 144 may include the first camera device 144_1, the second camera device 144_2, and the third camera device 144_3. The first camera device 144_1 and the third camera device 144_3 may be disposed above or inside the bumper area of the vehicle. The first camera device 144_1 may be disposed adjacent to any one of the corners of the bumper area. The third camera device 144_3 may be disposed adjacent to a corner of the bumper area except for the corner where the first camera device 144_1 is disposed. The second camera device 144_2 may be disposed around the rear view mirror of the vehicle and/or adjacent to the driver seat. At least portions of field of views (FOV) of the first camera device 144_1, the second camera device 144_2, and the third camera device 144_3 may overlap each other.

The camera 144 may image an external environment. The camera 144 may fuse image information imaged by the first camera device 144_1, the second camera device 144_2, and the third camera device 144_3 with each other. The camera 144 may acquire a three-dimensional image using differences between field of views (FOV) based on differences between positions of the first camera device 144_1, the second camera device 144_2, and the third camera device 144_3. The camera 144 may transmit the image data of the external environment as captured to the processor 110.

Figure 6:
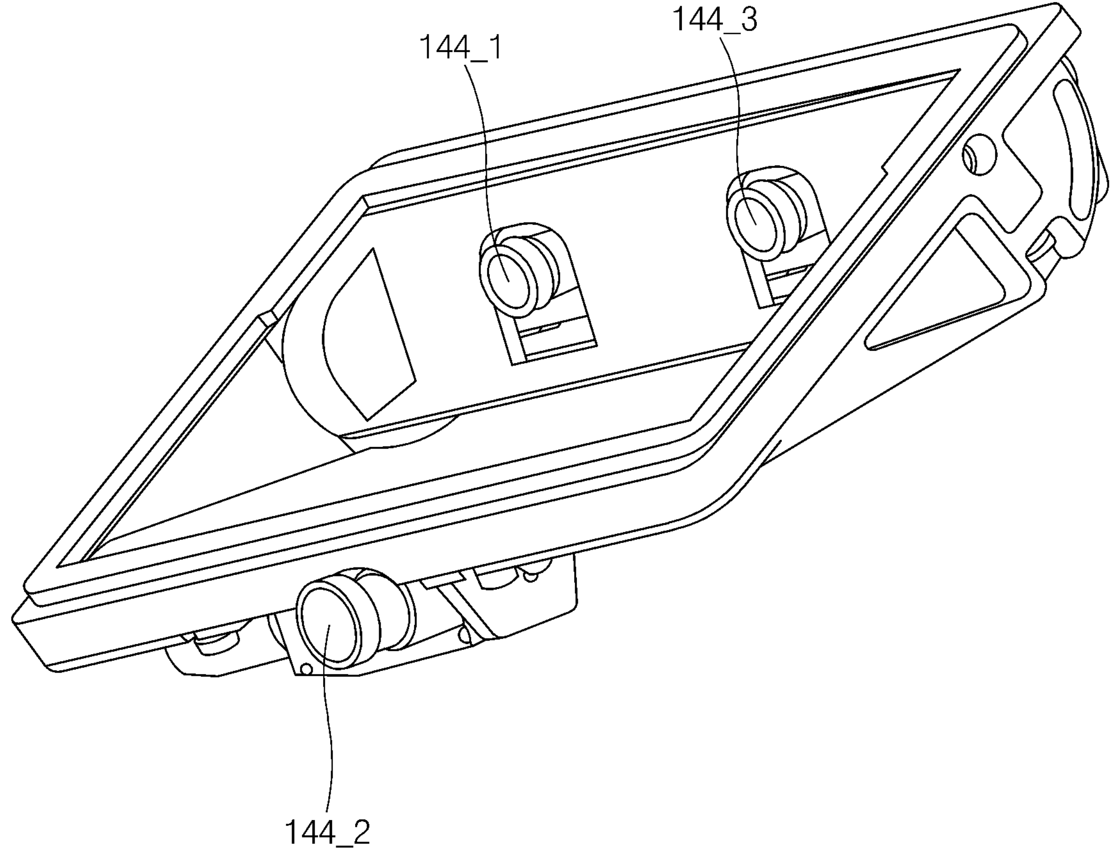
FIG. 6 is a view showing a plurality of camera devices of a vehicle control system according to one embodiment of the present disclosure.

FIG. 6 is a view showing a plurality of camera devices of the vehicle control system according to one embodiment of the present disclosure.

Figure 7:
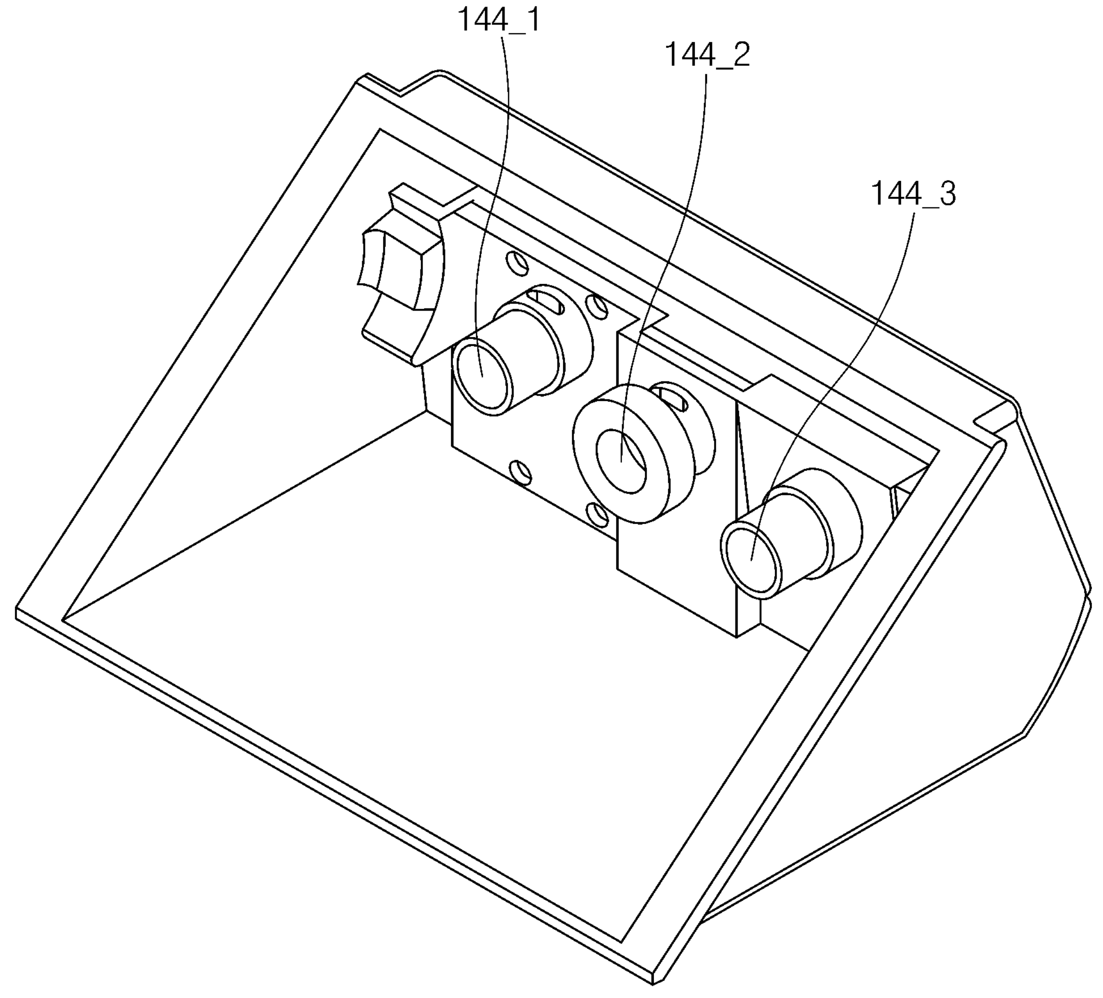
FIG. 7 is a view showing a plurality of camera devices of a vehicle control system according to one embodiment of the present disclosure.

The plurality of camera devices may include the first camera device 144_1, the second camera device 144_2, and the third camera device 144_3. FIG. 7 is a view showing a plurality of camera devices of a vehicle control system according to one embodiment of the present disclosure. The plurality of camera devices may include the first camera device 144_1, the second camera device 144_2, and the third camera device 144_3.

Each of the first camera device 144_1, the second camera device 144_2, and the third camera device 144_3 may include an image capture device of an appropriate type. The image capture device may include an optical axis. The image capture device may include an Aptina M9V024 WVGA sensor of a global shutter scheme. The image capture device may provide a resolution of 1280×960 pixels and may include a rolling shutter scheme. The image capture device may include a variety of optical elements. The image capture device may include at least one lens to provide a focal length and a field of view (FOV) required by the image capture device. The image capture device may be combined with a 6 mm lens or a 12 mm lens.

Each of the first camera device 144_1, the second camera device 144_2, and the third camera device 144_3 may have a designated field of view (FOV) angular range. Each of the first camera device 144_1, the second camera device 144_2, and the third camera device 144_3 may have a general field of view (FOV) angular range of 40 degrees or greater and 56 degrees or smaller. Each of the first camera device 144_1, the second camera device 144_2, and the third camera device 144_3 may have a narrow field of view (FOV) angular range of 23 degrees or greater and 40 degrees or smaller. Each of the first camera device 144_1, the second camera device 144_2, and the third camera device 144_3 may have a wide FOV (field of view) angular range of 100 degrees or greater and 180 degrees or smaller. Each of the first camera device 144_1, the second camera device 144_2, and the third camera device 144_3 may include a wide-angle bumper camera or a camera capable of securing up to a 180-degree field of view (FOV). The field of view (FOV) of the first camera device 144_1 may be wider, narrower, or partially overlapping than the field of view (FOV) of the second camera device 144_2.

A 7.2 megapixel image capture device with an aspect ratio of about 2:1 (e.g., H×V=3800×1900 pixels) and a horizontal field of view (FOV) of about 100 degrees may replace a configuration of a plurality of camera device composed of the first camera device 144_1, the second camera device 144_2, and the third camera device 144_3. A vertical field of view (FOV) of a megapixel image capture device using a radially symmetrical lens may be realized to be 50 degrees or smaller due to lens distortion. A radially asymmetric lens may be used to achieve a vertical field of view (FOV) of 50 degrees or greater for a horizontal field of view (FOV) of 100 degrees.

A driving support function may be provided using a multi-camera system including a plurality of camera devices. The multi-camera system may use at least one camera facing in a front direction of the vehicle. In the multi-camera system, at least one camera may face in a side direction or a rear direction of the vehicle. The multi-camera system may be configured so that the first camera device 144_1 and the second camera device 144_2 face in the front direction and/or the side direction of the vehicle using a dual-camera imaging system.

The multi-camera systems including the plurality of camera devices may employ a triple camera imaging system in which FOVs (field of view) of the first camera device 144_1, the second camera device 144_2, and the third camera device 144_3 are different from each other. The triple-camera imaging system may perform determinations based on information obtained from objects positioned at various distances in the front and side directions of the vehicle.

The first camera device 144_1 may be connected to a first image processor to perform monocular image analysis of an image provided by the first camera device 144_1. The second camera device 144_2 may be connected to a second image processor to perform monocular image analysis of an image provided by the second camera device 144_2. Information processed and output by the first and the second image processors may be combined with each other. The second image processor may receive images from both the first camera device 144_1 and the second camera device 144_2 and perform three-dimensional analysis thereon. Monocular image analysis may mean image analysis performed based on an image captured from a single field of view (e.g., an image captured by a single camera). The three-dimensional image analysis may mean image analysis performed based on two or more images captured with at least one image capture parameter (e.g., images captured respectively by at least two cameras). Captured images suitable for three-dimensional image analysis may include images captured from at least two positions, images captured from different fields of views (FOV), images captured using different focal lengths, and images captured based on parallax information.

Figure 8:
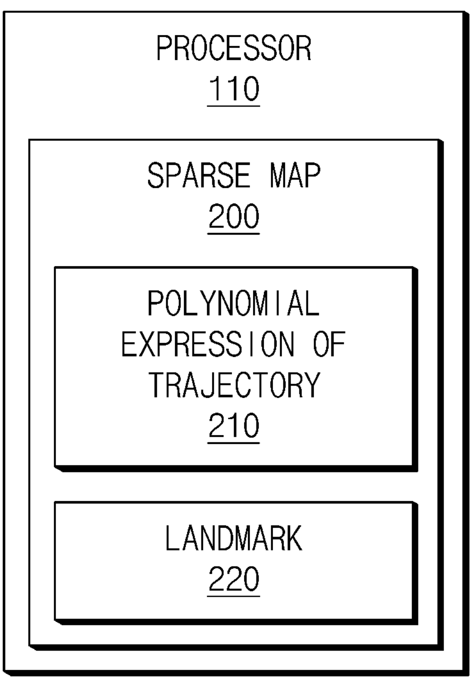
FIG. 8 is a block diagram showing a sparse map of a processor according to one embodiment of the present disclosure.

FIG. 8 is a block diagram showing a sparse map of a processor according to one embodiment of the present disclosure.

The processor 110 may include a sparse map 200. The sparse map 200 may be used for autonomous driving. The sparse map 200 may provide information for navigation of autonomous driving vehicles. The sparse map 200 and the data processed by the sparse map 200 may be stored in a memory of the vehicle control system or may be transmitted/received to/from a remote server. The sparse map 200 may store therein and use a polynomial expression of at least one trajectory along which the vehicle travels on a road. In the sparse map 200, a feature of a road section may be simplified and may be recognized as an object. The sparse map 200 may reduce an amount of data stored and transmitted/received for autonomous driving vehicle navigation. The sparse map 200 may include a polynomial expression 210 of a trajectory and a landmark 220.

The polynomial expression 210 of the trajectory may be a polynomial expression of a target trajectory for guiding autonomous driving along a road section. The target trajectory may represent an ideal route for a vehicle to travel in a road section. The road section may be expressed with at least one target trajectory. The number of target trajectories may be smaller than the number of a plurality of lines included in the road section. A vehicle operating on a road may determine navigation in consideration of a line corresponding to the target trajectory and a line offset using one of the target trajectories.

The landmark 220 may be a place or a mark associated with a specific road section or a local map. The landmark 220 may be identified and stored in the sparse map 200. A spacing between landmarks 220 may be adjusted. The landmark 220 may be used for autonomous driving navigation. The landmark 220 may be used to determine the vehicle's current position with respect to the stored target trajectory. An autonomous driving vehicle may adjust a travel direction at a current position so as to coincide with a direction of the target trajectory using the vehicle's current position information.

The landmark 220 may be used as a reference point for determining a position of the vehicle with respect to the target trajectory. While the vehicle drives based on dead reckoning in which the vehicle determine its itself-movement and estimates its position with respect to the target trajectory, the vehicle may eliminate an error in a position determination due to the dead reckoning, using a position of the landmark 220 that appears in the sparse map 200. The landmark 220 identified in the sparse map 200 may act as an anchor to allow the vehicle to accurately determine the vehicle's position with respect to the target trajectory.

Figure 9:
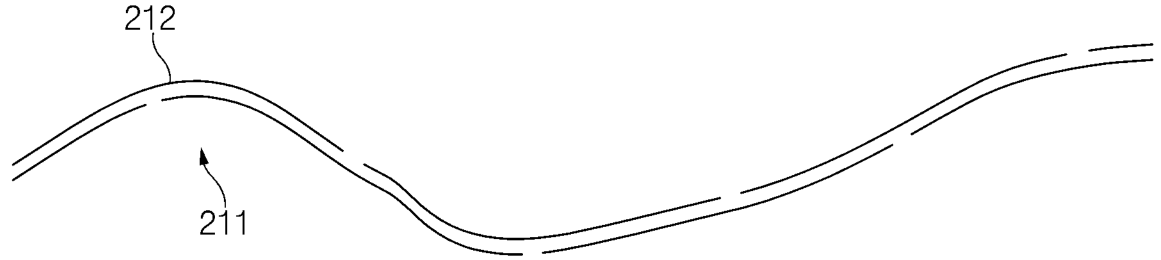
FIG. 9 is a diagram showing a polynomial expression of a trajectory according to one embodiment of the present disclosure.

FIG. 9 is a diagram showing the polynomial expression of the trajectory according to one embodiment of the present disclosure.

The sparse map may include information about a feature of a road. The sparse map may store therein a curved shape in sections 212 included in a road 211. Each of the sections 212 may have a curved shape that may be expressed as a polynomial. The road 211 may be modeled as a three-dimensional polynomial expression as a combination of the curved shapes of the lines, each line including left and right sides. A plurality of polynomials may be used to express a position and a shape of the road 211 and each of the sections 212 included in the road 211. A polynomial expressing each of the sections 212 may define a position and a shape of the section 212 within a specified distance.

Figure 10:
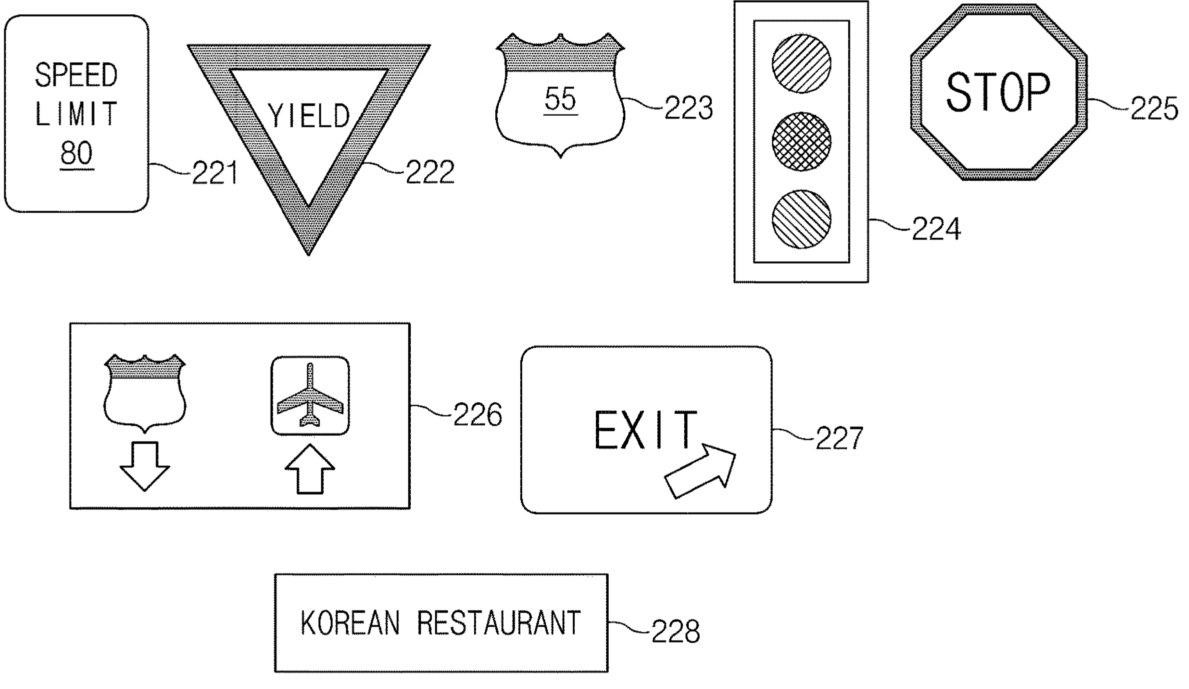
FIG. 10 is a diagram showing a landmark according to one embodiment of the present disclosure.

FIG. 10 is a diagram showing a landmark according to one embodiment of the present disclosure.

The landmarks may include a traffic sign plate, a direction indication sign plate, roadside facilities, and a general sign plate. The traffic sign plate may be a sign plate that guides traffic conditions and regulations to be observed during driving. The traffic sign plate may include a speed limit sign plate 221, a yield sign plate 222, a road number sign plate 223, a traffic signal sign plate 224, and a stop sign plate 225. The direction indication sign plate may be a sign plate with at least one arrow indicating at least one direction to another location. The direction indication sign plate may include a highway sign plate 226 with an arrow guiding the vehicle to another road or location and an exit sign plate 227 with an arrow guiding the vehicle out of the road. The general sign plate may be a sign plate that provides information related to a place. The general sign plate may include a signboard 228 of a famous restaurant in an area.

The sparse map may include a plurality of landmarks related to the road section. A simplified image of an actual image of each landmark may be stored in the sparse map. The simplified image may be composed of data depicting a feature of the landmark. The image stored in the sparse map may be expressed and recognized using a smaller amount of data than an amount of data required by the actual image. Data representing the landmark may include information to depicting or identify the landmark formed along the road.

Figure 11:
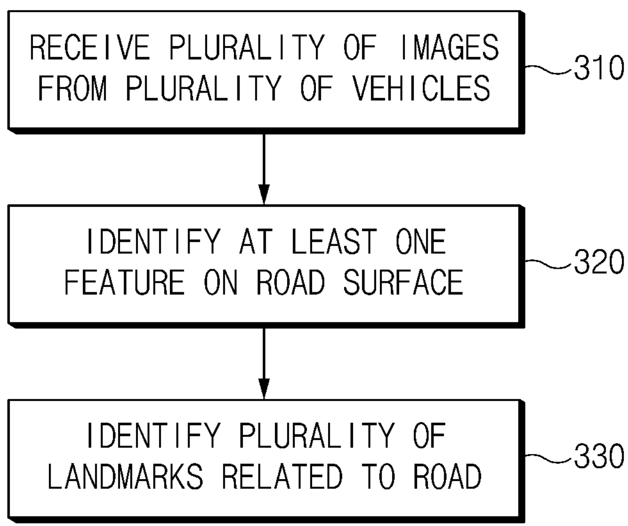
FIG. 11 is a flowchart showing a method in which a vehicle control system according to one embodiment of the present disclosure generates a sparse map.

FIG. 11 is a flowchart showing a method of generating a sparse map according to one embodiment of the present disclosure.

The vehicle control system may receive a plurality of images from a plurality of vehicles in operation 310. Each of the plurality of cameras disposed on the vehicle may image a vehicle surrounding situation which the vehicle faces while driving along the road section and thus may capture a plurality of images showing the vehicle surrounding situation. The plurality of images showing the vehicle surrounding situation may show a shape and a situation of the vehicle's travel route. The vehicle control system may receive the plurality of images captured by the plurality of cameras.

The vehicle control system may identify at least one feature on a road surface in operation 320. The vehicle control system may simplify a feature of the road surface running along the road section as a representation of at least one line, based on the plurality of images. The simplified line representation of the feature of the road surface may represent a route along the road section substantially corresponding to the road surface feature. The vehicle control system may analyze the plurality of images received from the plurality of cameras to identify an edge or a lane mark of a road. The vehicle control system may determine a travel trajectory following a road section associated with the edge of the road or the lane mark thereof. A trajectory or line representation may include a spline, a polynomial expression, or a curve. The vehicle control system may determine the vehicle's travel trajectory based on the camera's itself-movement, such as 3D translation and/or 3D rotational movement.

The vehicle control system may identify a plurality of landmarks related to the road in operation 330. The vehicle control system may analyze the plurality of images received from the camera to identify at least one landmark on the road section. The landmarks may include the traffic sign plate, the direction indication sign plate, the roadside facilities, and the general sign plate. The analysis may include a rule for admitting and rejecting a determination that the landmark may be a landmark related to a road section. The analysis may include a rule in which when a ratio of images in which the landmark appears to images in which no landmark appears exceeds a threshold value, the determination that the landmark may be a landmark related to a road section is admitted, and a rule in which when a ratio of images in which no landmark appears to images in which the landmark appears exceeds a threshold value, the determination that the landmark may be a landmark related to a road section is rejected.

Figure 12:
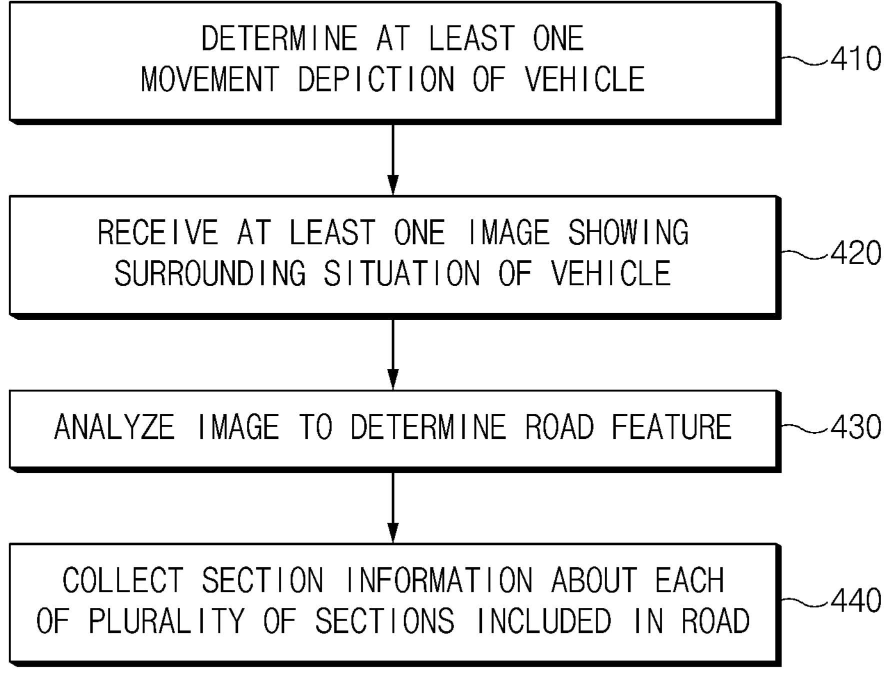
FIG. 12 is a flowchart showing a method for anonymizing navigation information by a vehicle control system according to one embodiment of the present disclosure.

FIG. 12 is a flowchart showing a method in which the vehicle control system according to one embodiment of the present disclosure anonymize navigation information.

The vehicle control system may determine at least one movement depiction of the vehicle in operation 410. The vehicle control system may determine at least one movement depiction based on an output value of the sensor. At least one movement description may include any indicator of the vehicle's movement. For example, at least one movement depiction may include an acceleration of the vehicle, a speed of the vehicle, longitudinal and transversal positions of the vehicle at a specific time, a three-dimensional position of the vehicle, and a determined trajectory of the vehicle.

At least one movement depiction may include the vehicle's itself-movement depiction in a predetermined coordinate system. The itself-movement may include rotation, translation, or movement in a transverse direction, longitudinal direction, or other directions of the vehicle. The vehicle's itself-movement may be expressed using a speed, a yaw rate, a tilt or a roll of the vehicle. A self-movement depiction of the vehicle may be determined on a given level of freedom.

The vehicle control system may receive at least one image showing the surrounding situation of the vehicle in operation 420. The vehicle control system may receive, from the camera, an image of the road on which the vehicle is driving and an image of a surrounding around the vehicle.

The vehicle control system may analyze the image to determine a road feature in operation 430. The vehicle control system may analyze at least one image according to a command stored in the image analysis module, or utilize a learning system such as a neural network to determine at least one road feature. At least one road feature may include a road feature such as a median line of the road, an edge of the road, a landmark along the road, a pothole on the road, a turn of the road, or the like. At least one road feature may include a lane feature including an indicator indicating at least one of lane separation, lane merging, dashed-line lane indication, solid-line lane indication, a road surface color in a lane, a line color, a lane direction, or a lane type regarding a lane as detected. The lane feature may include a determination that the lane is a HOV (High-Occupancy Vehicles) lane and a determination that the lane is separated from another lane by a solid line. At least one road feature may include an indicator of a road edge. The road edge may be determined based on a detected barrier along the road edge, a detected sidewalk, a line indicating an edge, a road boundary stone along the road edge, or based on detection of an object along the road.

The vehicle control system may collect section information about each of a plurality of sections included in the road in operation 440. The vehicle control system may divide the road into the plurality of sections. The vehicle control system may combine each of the plurality of sections with the road feature to collect the section information about each of the plurality of sections. The section information may include at least one movement depiction of the vehicle and/or at least one road feature relative to the section of the road. The vehicle control system may collect the section information including the movement depiction calculated in operation 410 and the road feature determined in operation 430.

Figure 13:
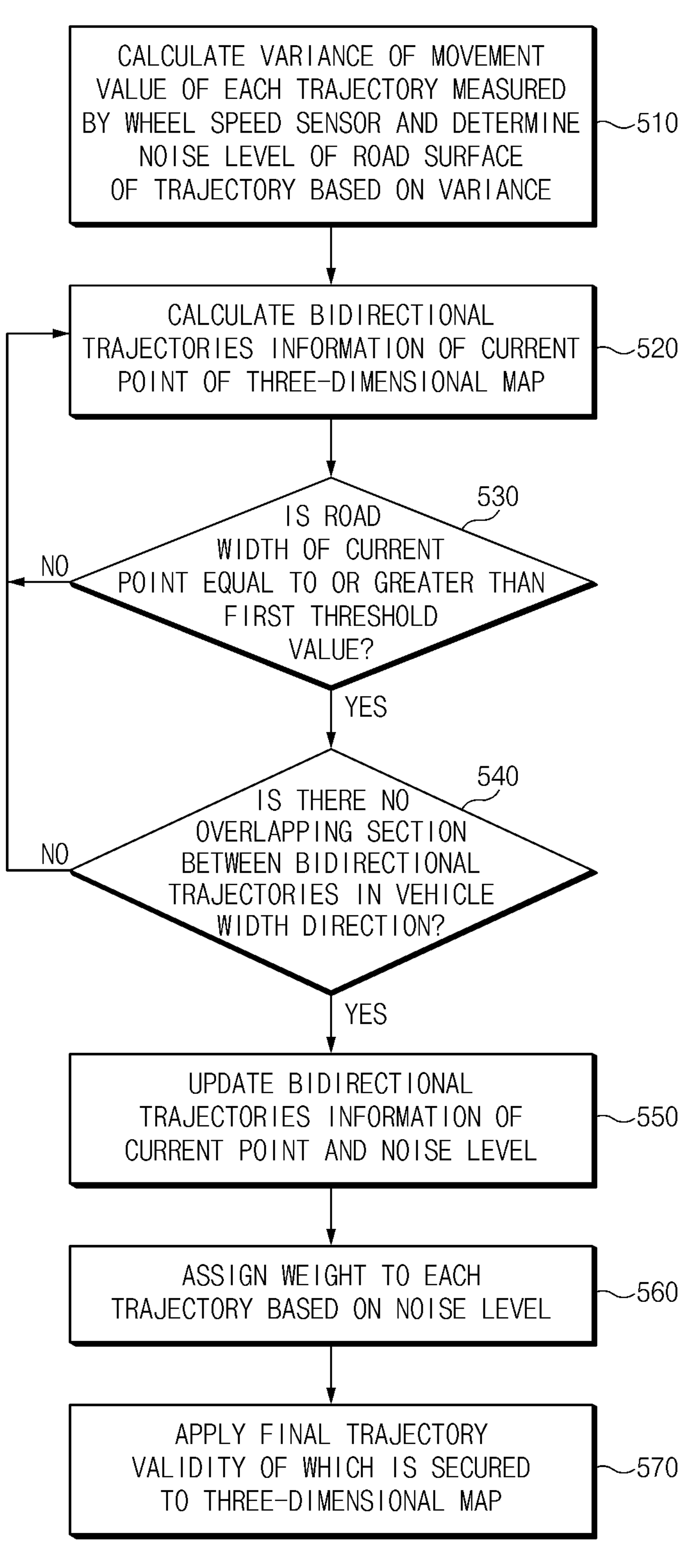
FIG. 13 is a flowchart illustrating a method in which a vehicle control system according to one embodiment of the present disclosure calculates a valid trajectory.

FIG. 13 is a flowchart illustrating a method in which a vehicle control system according to one embodiment of the present disclosure calculates a valid trajectory. To calculate the valid trajectory, after calculating the plurality of trajectories, a trajectory whose validity is lower than a certain reference is removed, and trajectories whose validity is greater than or equal to the certain reference are combined with each other to finally calculate the valid trajectory.

The vehicle control system may calculate a variance of a movement value of each trajectory measured by a wheel speed sensor and may determine a noise level of a road surface of the trajectory based on the variance in operation 510. The vehicle control system may calculate a difference value between a maximum value and a minimum value for a specified time for each of the plurality of wheel speed sensors. The vehicle control system may calculate a movement variance value for a specified time based on the difference value of each of the plurality of wheel speed sensors. The vehicle control system may determine an average noise level of the road surface based on the movement variance value. The noise level of the road surface may be classified into levels from 0 to 5 levels.

The vehicle control system may calculate bidirectional trajectories information of a current point of the three-dimensional map in operation 520.

The vehicle control system may identify whether a road width of a current point is equal to or greater than a first threshold value in operation 530. The vehicle control system may proceed to operation 540 when the road width of the current point is equal to or greater than the first threshold value (operation 530—YES). The vehicle control system may return to operation 520 when the road width of the current point is smaller than the first threshold value (operation 530—NO).

The vehicle control system may identify whether there is no overlapping section between the bidirectional trajectories in a vehicle width direction in operation 540. The vehicle control system may proceed to operation 550 when there is no overlapping section (operation 540—YES). The vehicle control system may return to operation 520 when there are overlapping sections (operation 540—NO).

The vehicle control system may update the bidirectional trajectories information of the current point and the noise level in operation 550. The vehicle control system may update the bidirectional trajectories values and the road surface noise level when there is no overlapping section between the bidirectional trajectories.

The vehicle control system may assign a weight to each trajectory based on the noise level in operation 560. When calculating a final valid trajectory, the vehicle control system may give different weights to different positions of each trajectory based on the noise level.

The vehicle control system may apply the final trajectory the validity of which is secured to a three-dimensional map in operation 570. The vehicle control system may calculate the final trajectory whose validity is secured. The vehicle control system may apply a more reliable trajectory when constructing the 3D map, thereby improving the reliability of an autonomous driving system.

Figure 14:
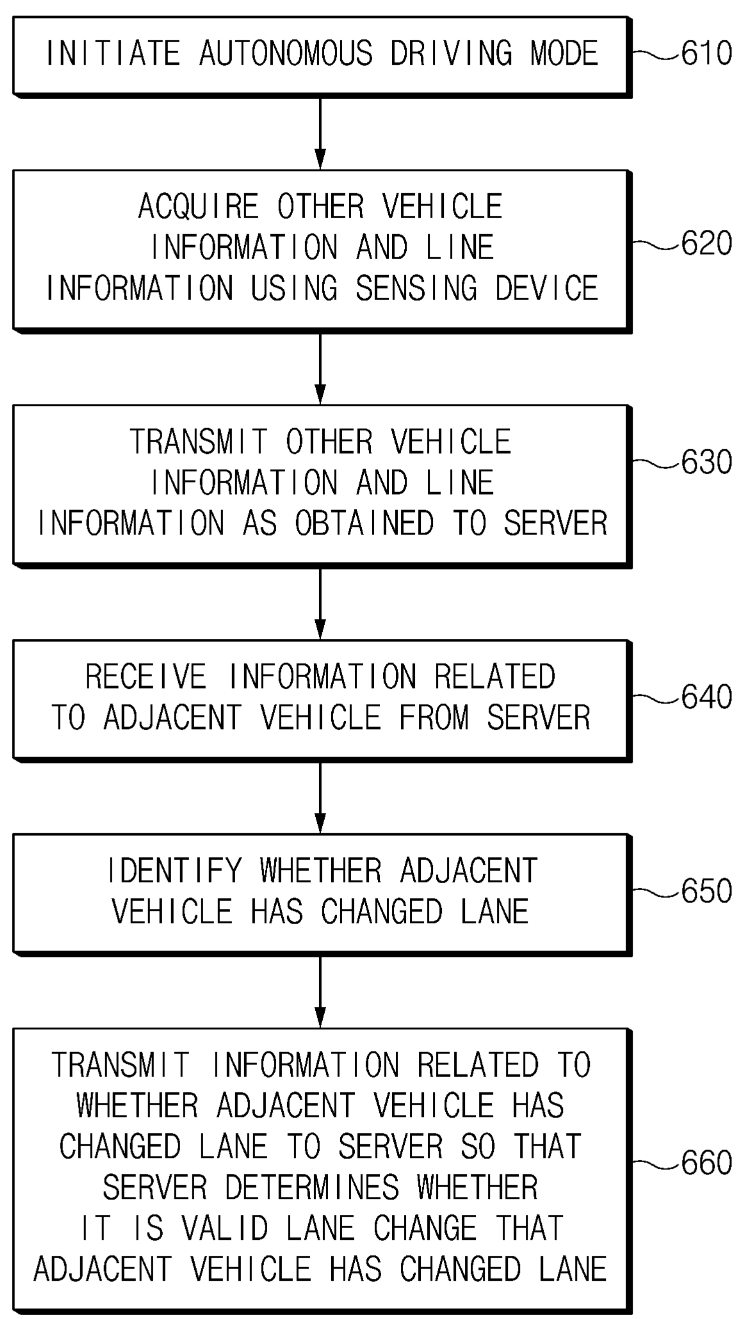
FIG. 14 is a flowchart showing a method in which when a vehicle control system according to one embodiment of the present disclosure calculates a trajectory of a vehicle using a server, the vehicle control system improves reliability of the trajectory.

FIG. 14 is a flowchart showing a method in which when a vehicle control system according to one embodiment of the present disclosure calculates a trajectory of a vehicle using a server, the vehicle control system improves reliability of the trajectory.

The vehicle control system may initiate the autonomous driving mode in operation 610. When constructing a 3D map in the autonomous driving mode, the trajectory position of each vehicle may be clustered more reliably.

The vehicle control system may acquire other vehicle information and line information using the sensing device in operation 620. The vehicle control system may synthesize information of vehicles recognized using the sensing device and GPS information with each other to acquire the line information.

The vehicle control system may transmit the other vehicle information and the line information as obtained to the server in operation 630. The vehicle control system may transmit information of the vehicles recognized using the sensing device, line information, and GPS information to a cloud server.

The vehicle control system may receive information related to an adjacent vehicle from the server in operation 640. The server may determine a vehicle adjacent to a target vehicle among other vehicles. The server may identify whether a vehicle is driving in an adjacent lane to a lane in which a target vehicle drives, using a distance between the plurality of vehicles included in the GPS information of each of the plurality of vehicles, a moving speed of each of the plurality of vehicles, and a moving direction of each of the plurality of vehicles. The server may identify the number of lanes of a corresponding road from a navigation map. The server may combine the recognition information of each of the plurality of vehicles onto the navigation map to predict whether lane information of each of the plurality of vehicles is a first lane or a second lane. The server may transmit information related to the adjacent vehicle to the target vehicle. The vehicle control system may receive information related to the adjacent vehicle from the server.

The vehicle control system may identify whether the adjacent vehicle has changed the lane in operation 650. The vehicle control system may identify whether the adjacent vehicle has changed a lane. When the line on the road is recognized, the vehicle control system may determine similarity of a FOV (field of view) angular range of a line toward a position of the adjacent vehicle and a longitudinal distance of an object with each other, and may identify whether a signal of the FOV (field of view) range of the line is discontinuous and thus may identify whether the adjacent vehicle has changed the lane. When the line on the road is not recognized, the vehicle control system may create a virtual line based on a yaw rate based on the target vehicle, and may identify whether the adjacent vehicle invades the virtual line and thus may identify whether the adjacent vehicle has changed the lane.

The vehicle control system may transmit information related to whether the adjacent vehicle has changed the lane to the server so that the server determines whether it is a valid lane change that the adjacent vehicle has changed the lane in operation 660. The server may determine whether the lane change is valid or not, and may exclude an unnecessary lane change trajectory from trajectory calculating. The server may determine whether a lane change from each lane information is an unnecessary lane change or a necessary lane change using the navigation map information. The server may identify whether a lane change occurs from each of lanes of a corresponding road and then determine whether the lane change is a valid trajectory. The server may determine whether the corresponding lane change is a valid trajectory using surrounding information such as toll gate information, road entrance information, and road exit information. When the server determines that the corresponding lane change is an unnecessary lane change trajectory as a lane change excluding a valid lane change, the server may exclude the lane change from valid trajectory calculating. The server may only cluster reliable trajectories for each lane. Accordingly, the reliability of the autonomous driving system may be improved via more reliable trajectory information calculation when constructing the 3D map.

Each step included in the methods described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

The present disclosure improves accuracy of a travel route on which the vehicle is to drive.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle control system comprising:

at least one sensor including a plurality of wheel sensors configured to acquire data related to driving of a vehicle from the vehicle and an external environment; and one or more processors configured to:

process the data related to the driving of the vehicle to determine at least one candidate trajectory;

for each of the wheel speed sensors, calculate a difference value between a maximum and a minimum speed measurement over a specified time duration, and compute a variance of a movement value from the difference values;

determine a noise level of a road surface associated with the at least one candidate trajectory based on the computed variance;

calculate bidirectional trajectories information of a current point of a three-dimensional map of a driving environment;

identify whether a road width of the current point is greater than or equal to a first threshold value, in response to a determination that the road width is greater than or equal to the threshold and that there is no overlapping section between bidirectional trajectories in a vehicle width direction, update the bidirectional trajectory information and the corresponding noise level;

assign weights to positions along the candidate trajectory based on the determined noise level, such that trajectory segments corresponding to lower noise levels are weighted more heavily;

generate a final valid trajectory from the candidate trajectory based on the weighted positions;

apply the final valid trajectory to the three-dimensional map; and control the vehicle to adjust a travel direction according to the final valid trajectory.

2. The system of claim 1, wherein the system further comprises:

an input device for receiving a user input for controlling a driving function of the vehicle;

an imaging device for sensing and imaging the external environment;

an output device providing information related to the driving of the vehicle; and a vehicle controller configured to control the driving of the vehicle.

3. A vehicle control system comprising:

at least one sensor for acquiring data related to the driving of the vehicle from a vehicle and an external environment;

a vehicle controller configured to control the driving of the vehicle; and one or more processors configured to:

process the data related to driving of a vehicle;

acquire other vehicle information and lane information using the at least one sensor;

transmit the other vehicle information and the lane information to a server, receive, from the server, information related to an adjacent vehicle including an indication of a detected or predicted lane change by the adjacent vehicle;

identify whether the adjacent vehicle has changed lanes based on sensor data and predicted trajectory; and transmit information related to whether the adjacent vehicle has changed the lane along with confidence data based on road surface conditions or sensor reliability to the server, wherein the server determines whether the lane change of the adjacent vehicle is valid by aggregating data from multiple vehicles and applying filtering based on reported noise levels, trajectory consistency, or historical behavior patterns, and the vehicle controller is configured to control the driving of the vehicle based on whether the lane change of the adjacent vehicle is valid.

4. The system of claim 3, wherein the system further comprises:

an input device for receiving a user input for controlling a driving function of the vehicle;

an imaging device for sensing and imaging the external environment; and an output device for providing information related to the driving of the vehicle.

5. The system of claim 3, wherein the one or more processors are configured to transmit GPS information, information about at least one of the vehicle and the adjacent vehicle, and the lane information recognized using the at least one sensor to the server.

6. The system of claim 3, wherein when a line on an actual road is recognized, the one or more processors are configured to:

determine similarity of a field of view (FOV) range of a line toward a position of the adjacent vehicle and a longitudinal distance of an object with each other; and identify whether a signal of the FOV range of the line is discontinuous and thus identify whether the adjacent vehicle has changed the lane.

7. The system of claim 3, wherein when the line on the road is not recognized, the one or more processors are configured to:

generate a virtual line based on a yaw rate based on the vehicle having the system; and identify whether the adjacent vehicle crosses the virtual line and thus identify whether the adjacent vehicle has changed the lane.

8. The system of claim 3, wherein the server is configured to exclude unnecessary line change trajectory as a line change other than the valid line change in calculating a trajectory.

9. A method for driving a vehicle using a vehicle control system, the method comprising:

receiving, from at least one sensor including a wheel speed sensor, movement values of a vehicle over a time interval;

calculating, for each trajectory, a variance of the movement values and determining a noise level of a road surface associated with the trajectory based on the variance;

calculating bidirectional trajectory information for a current point of the vehicle on a three-dimensional map;

identifying whether a road width of the current point is greater than or equal to a first threshold value, identifying whether there is no overlapping section between the bidirectional trajectories in a direction corresponding to a width of the vehicle, in response determining that the road width is equal to or greater than the first threshold value;

updating the bidirectional trajectory information and the noise level of the current point only in response to determining that the bidirectional trajectories do not overlap;

assigning a weight to each trajectory based on the noise and determining a final valid trajectory by prioritizing lower-noise, higher-confidence trajectory segments;

applying the final valid trajectory to the three-dimensional map; and controlling the vehicle to adjust a travel direction according to the final valid trajectory.

10. The method of claim 9, wherein calculating the variance of the movement values comprises computing a difference between a maximum value and a minimum wheel speed over a predefined time window for each wheel speed sensor, and using the computed variance to derive the road surface noise level.

11. The method of claim 9, wherein updating the bidirectional trajectory information and the noise level is suppressed when the bidirectional trajectories partially overlap within a vehicle width threshold, thereby preventing unreliable map updates.

12. The method of claim 9, wherein the weight applied to each trajectory is a confidence score that is inversely proportional to the noise level, and the final valid trajectory is selected by maximizing the aggregated confidence along the trajectory.

* * * * *